(12) United States Patent
Egami et al.

(10) Patent No.: US 7,615,943 B2
(45) Date of Patent: Nov. 10, 2009

(54) CONTROL APPARATUS AND METHOD FOR ELECTRIC VEHICLES

(75) Inventors: Tsuneyuki Egami, Gamagori (JP); Keiichi Kawakami, Anjo (JP)

(73) Assignee: DENSO Corporation, Kariya (JP)

( * ) Notice: Subject to any disclaimer, the term of this patent is extended or adjusted under 35 U.S.C. 154(b) by 154 days.

(21) Appl. No.: 11/605,456

(22) Filed: Nov. 29, 2006

(65) Prior Publication Data
US 2007/0119634 A1    May 31, 2007

(30) Foreign Application Priority Data
Nov. 29, 2005    (JP) .............................. 2005-343750

(51) Int. Cl.
*H02P 5/00*    (2006.01)
(52) U.S. Cl. .................. 318/139; 318/700; 318/801
(58) Field of Classification Search .............. 318/432, 318/139, 504, 700, 801, 808, 809, 812; 180/2.2; 361/6, 18; 363/19; 323/312
See application file for complete search history.

(56) References Cited

U.S. PATENT DOCUMENTS

| | | | | |
|---|---|---|---|---|
| 4,091,294 | A * | 5/1978 | Zankl et al. | 318/773 |
| 4,511,834 | A * | 4/1985 | Studtmann | 318/700 |
| 6,331,365 | B1 * | 12/2001 | King | 429/9 |
| 6,661,109 | B2 * | 12/2003 | Fukasaku et al. | 290/40 C |
| 7,099,756 | B2 * | 8/2006 | Sato | 701/22 |
| 7,212,891 | B2 | 5/2007 | Sato | |
| 7,235,937 | B2 * | 6/2007 | Takai et al. | 318/139 |
| 7,243,006 | B2 * | 7/2007 | Richards | 700/286 |
| 7,279,855 | B2 * | 10/2007 | Tahara et al. | 318/46 |
| 7,355,869 | B2 * | 4/2008 | Okamura | 363/132 |
| 7,372,223 | B2 * | 5/2008 | Yamaguchi et al. | 318/254.1 |
| 2002/0110007 | A1 | 8/2002 | Kalman et al. | |
| 2004/0145338 | A1 | 7/2004 | Nakamura et al. | |
| 2004/0145356 | A1 | 7/2004 | Kalman et al. | |
| 2006/0052915 | A1 | 3/2006 | Sato | |
| 2006/0066275 | A1 * | 3/2006 | Thunes et al. | 318/432 |
| 2006/0247829 | A1 | 11/2006 | Sato | |
| 2007/0119634 | A1 | 5/2007 | Egami et al. | |
| 2007/0125582 | A1 | 6/2007 | Egami et al. | |
| 2007/0126385 | A1 | 6/2007 | Egami et al. | |
| 2007/0145926 | A1 | 6/2007 | Egami et al. | |
| 2007/0145927 | A1 | 6/2007 | Egami et al. | |
| 2007/0194763 | A1 | 8/2007 | Egami et al. | |

FOREIGN PATENT DOCUMENTS

EP        1000796 A2    5/2000

(Continued)

OTHER PUBLICATIONS

U.S. Appl. No. 11/606,060, filed Nov. 30, 2006.

(Continued)

*Primary Examiner*—Bentsu Ro
*Assistant Examiner*—Antony M Paul
(74) *Attorney, Agent, or Firm*—Nixon & Vanderhye P.C.

(57) ABSTRACT

In electric vehicle control, system voltage stabilization control is executed to reduce the difference between a target value and detected value of a system voltage generated by a voltage boosting converter for an AC motor. Further, conversion power control is executed to reduce the difference between a command value and detected value of the conversion power, which is defined as the output power of the voltage boosting converter. Thus, variations in a system voltage caused by an error or the conversion power control can be reduced.

16 Claims, 4 Drawing Sheets

FOREIGN PATENT DOCUMENTS

| | | |
|---|---|---|
| EP | 1 460 756 A1 | 9/2004 |
| EP | 1603224 A | 12/2005 |
| EP | 1 800 934 A2 | 6/2007 |
| EP | 1 800 936 A2 | 6/2007 |
| JP | 2003-259689 | 9/2003 |

OTHER PUBLICATIONS

U.S. Appl. No. 11/606,061, filed Nov. 30, 2006.
U.S. Appl. No. 11/640,407, filed Dec. 18, 2007.
U.S. Appl. No. 11/643,980, filed Dec. 22, 2006.
U.S. Appl. No. 11/653,848, filed Jan. 17, 2007.
U.S. Appl. No. 11/707,903, filed Feb. 20, 2007.
Extended EP Search Report dated Mar. 12, 2007.
Extended EP Search Report dated Feb. 28, 2007.
EPO Search/Examination Report dated Jul. 18, 2007 in European Application No. 07103332.8.
U.S. Appl. No. 11/950,768 filed Dec. 5, 2007 (unpublished).
U.S. Appl. No. 12/068,595, filed Feb. 8, 2008 (unpublished).
Examination Report issued Aug. 4, 2008 in corresponding European Application No. 06 125 077.5-2207.

\* cited by examiner

CONTROL APPARATUS AND METHOD FOR ELECTRIC VEHICLES

CROSS REFERENCE TO RELATED APPLICATION

This application is based on and incorporates herein by reference Japanese Patent Application No. 2005-343750 filed on Nov. 29, 2005.

This application is related to five US patent applications (IPICS 100145-US, 100223-US, 100120-US, 100725-US and 101862-US) claiming priorities to the following Japanese Patent Applications, respectively:

No. 2005-353075 filed on Dec. 7, 2005;

No. 2005-353076 filed on Dec. 7, 2005;

No. 2005-372966 filed on Dec. 26, 2005;

No. 2005-371264 filed on Dec. 26, 2005; and

No. 2006-40272 filed on Feb. 17, 2006.

FIELD OF THE INVENTION

The present invention relates to control apparatus and method for an electric vehicle including a system mounted therein as a system for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a motive power source of the vehicle, the AC motors are each capable of serving as a motor for driving wheels of the vehicle as well as a motor driven by the engine to generate power. As the above system, a control apparatus for the electric vehicle includes a voltage boosting converter for raising a voltage generated by a DC power supply, which is implemented by a secondary battery, to a high DC voltage appearing on a power supply line connected to the AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or the balance of electric power) of the two AC motors equal to 0 at the time the connection between the DC power supply and the voltage boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make the sum of energies (or the balance of power) of the two AC motors equal to 0 in a normal state, it is extremely difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient period in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve control apparatus and method for electric vehicles to be capable of stabilizing a voltage appearing on a power supply line in small size and low cost.

A control apparatus for an electric vehicle, in one aspect of the present invention, comprises a power conversion unit, a MG unit as a motor driving unit and a system voltage stabilization control unit. The power conversion unit converts a voltage generated by a DC power supply into a system voltage appearing on a power supply line. The MG unit includes an inverter connected to the power supply line and an AC motor driven by the inverter. The system voltage stabilization control unit executes system voltage stabilization control to stabilize the system voltage by adjusting an input power of the MG unit in order to suppress variations in system voltage.

A control method for an electric vehicle, in another aspect of the present invention, includes, in supplying first and second motor-generators input powers based on respective rotation angles and respective rotation speeds, a step of supplying a torque-free portion of the input power that does not change torque of the second motor-generator thereby to suppress variations in a system voltage on a power line.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
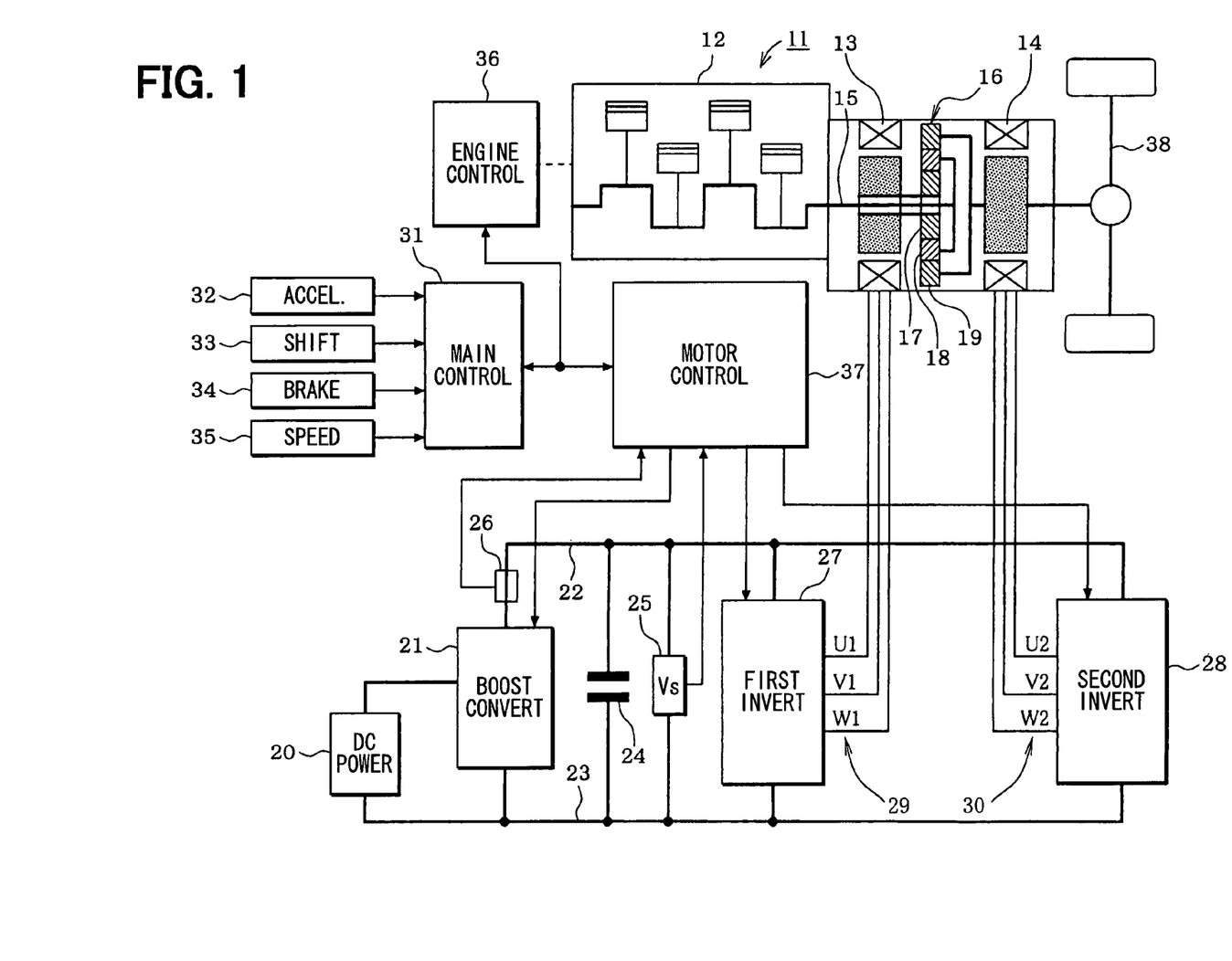
FIG. 1 is a block diagram showing a driving system for an electric vehicle in accordance with an embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at the center. The planetary gear 18 rotates along a circumference external to the sun gear 17 while revolving around the center of its own. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power supply 20 is connected to a voltage boosting converter 21 serving as a power conversion means. The voltage boosting converter 21 is a component having a function for increasing a DC voltage supplied by the DC power supply 20 in order to generate a DC system voltage supplied between a power supply line 22 and a ground line 23 as well as a function for decreasing the system voltage in order to return or restore power to the DC power supply 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit (first MG unit) 29. Similarly, the three-phase second inverter 28 and the second AC motor 14 form a second motor driving unit (second MG unit) 30.

A main control unit 31 is a computer for executing overall control on the electric vehicle as a whole. The main control unit 31 acquires signals output by a variety of sensors and switches in order to detect an operating state of the vehicle 11. The sensors and the switches include an accelerator sensor 32, a shift switch 33, a brake switch 34 and a vehicle speed sensor 35. The accelerator sensor 32 is a sensor for detecting an acceleration operation quantity representing an operation quantity of an acceleration pedal. The shift switch 33 is a sensor for detecting the position of a shift operation of the electric vehicle. The position of the shift operation can be a parking position (P), a rear driving position (R), a neutral position (N) or a forward driving position (D). The brake switch 34 is a switch for detecting a vehicle braking operation. The vehicle speed sensor 35 is a sensor for detecting a value of the speed of the electric vehicle. The main control unit 31 exchanges control and data signals with an engine control unit 36 and a motor control unit 37, driving the engine control unit 36 and the motor control unit 37 in order to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
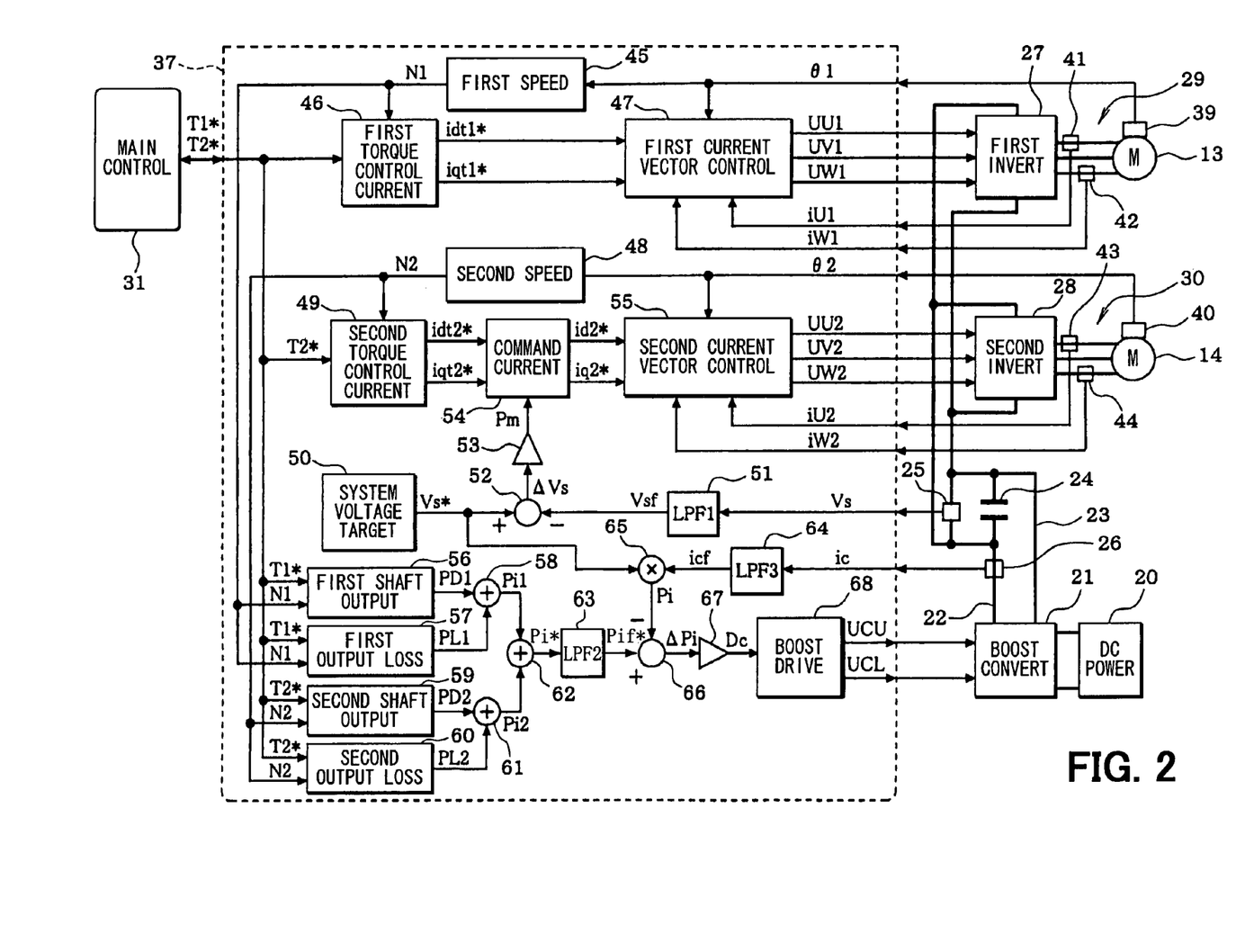
FIG. 2 is a block diagram showing a control system employed in the driving system as a control system for controlling AC motors of the driving system in accordance with the embodiment.

Next, control of the first AC motor 13 and the second AC motor 14 is described by referring to FIG. 2. The first AC motor 13 and the second AC motor 14 are each a three-phase permanent-magnet synchronous motor having an interior permanent magnet. The first AC motor 13 and the second AC motor 14 have respectively rotor rotational position sensors 39 and 40 each used for detecting the rotational position of the rotor of the motor. On the basis of three-phase voltage command signals UU1, UV1 and UW1 output by the motor control unit 37, the first inverter 27 of the voltage control type converts the DC voltage appearing on the power supply line 22 into three-phase AC voltages U1, V1 and W1 for driving the first AC motor 13. The DC voltage appearing on the power supply line 22 is a system voltage generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the first AC motor 13.

It is to be noted that the first AC motor 13 and the second AC motor 14 each also function as a generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as a deceleration energy is converted into DC power by the three-phase second inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. In an overdrive state, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator.

In execution of torque control on the first AC motor 13, the motor control unit 37 generates the three-phase voltage command signals UU1, UV1 and UW1 by a sinusoidal-waveform PWM control method on the basis of a torque command value T1* output by the main control unit 31, the U-phase current iU1 and W-phase current iW1 of the first AC motor 13 as well as the rotor rotational position θ1 of the first AC motor 13 as described below. The U-phase current iU1 and the W-phase current iW1 are signals output by the current sensors 41 and 42 respectively, whereas the rotor rotational position θ1 is a signal output by the rotor rotational position sensor 39.

The signal output by the rotor rotational position sensor 39 as a signal representing the rotor rotational position θ1 of the first AC motor 13 is supplied to a rotation speed computation unit 45 for computing a first rotation speed N1 of the first AC motor 13. Then, in order to apply current feedback control to each of a d-axis current id1 and a q-axis current iq1 independently of each other in a d-q coordinate system set as a rotational coordinate system of the rotor of the first AC motor 13, a first torque control current computation unit 46 computes a torque control current vector it1* representing a d-axis torque control current idt1* and a q-axis torque control current iqt1* by using typically map data or a mathematical equation as a vector according to the torque command value T1* and rotation speed N1 of the first AC motor 13.

Subsequently, a first current vector control unit 47 computes an actual current vector i1 representing the d-axis current id1 and the q-axis current iq1 on the basis of the U-phase current iU1 and W-phase current iW1 of the first AC motor 13 as well as the rotor rotational position θ1 of the first AC motor 13 as described below. The U-phase current iU1 and the W-phase current iW1 are signals output by the current sensors 41 and 42 respectively, whereas the rotor rotational position θ1 is a signal output by the rotor rotational position sensor 39. Then, the first current vector control unit 47 computes a d-axis command voltage Vd1* by execution of proportional-and-integral (P-I) control for reducing a difference Δid1 between a d-axis torque control current idt1* and an actual d-axis current id1, and computes a q-axis command voltage Vq1* by execution of P-I control for reducing a difference Δiq1 between a q-axis torque control current iqt1* and an actual q-axis current iq1. Finally, the first current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the three-phase first inverter 27.

In execution of torque control on the second AC motor 14, on the other hand, the motor control unit 37 generates the three-phase voltage command signals UU2, UV2 and UW2 by the sinusoidal-waveform PWM control method on the basis of a torque command value T2* output by the main control unit 31, the U-phase current iU2 and W-phase current iW2 of the second AC motor 14 as well as the rotor rotational position θ2 of the second AC motor 14. The U-phase current iU2 and the W-phase current iW2 are signals output by the current sensors 43 and 44 respectively, whereas the rotor rotational position θ2 is a signal output by the rotor rotational position sensor 40.

At this time, control of stabilizing the system voltage is executed in order to suppress variations in the system voltage while sustaining the torque generated by the second AC motor 14 at a constant value (that is, torque command value T2*) by adjusting an input power of the second AC motor 14 through adjustment of a current vector so as to change only the input power (or reactive power) different from the power required for generation of the torque of the second AC motor 14.

Specifically, first of all, the signal output by the rotor rotational position sensor 40 as a signal representing the rotor rotational position θ2 of the second AC motor 14 is supplied to a second rotation speed computation unit 48 for computing a second rotation speed N2 of the second AC motor 14. Then, in order to apply current feedback control to each of the d-axis current id2 and the q-axis current iq2 independently of each other in the d-q coordinate system set as a rotational coordinate system of the rotor of the second AC motor 14, a second torque control current computation unit 49 computes a torque control current vector it2* representing a d-axis torque control current idt2* and a q-axis torque control current iqt2* by using typically map data or a mathematical equation as a vector according to the torque command value T2* and rotation speed N2 of the second AC motor 14.

Then, a system voltage target value computation unit 50 serving as a target value computation means computes a target value Vs* of the system voltage, whereas the voltage sensor 25 supplies a detected value Vs of the system voltage to a low pass filter 51 serving as a first low-frequency component passing means for carrying out a low pass filtering process to pass only components included in the detected value Vs of the system voltage as components each having a low frequency. Subsequently, a subtractor 52 computes a difference ΔVs between the target value Vs* of the system voltage and a detected value Vsf output by the low pass filtering process as the detected value of the system voltage, supplying the difference ΔVs to the a P-I controller 53 serving as a power operation quantity computation means for computing an input power operation quantity Pm of the second AC motor 14 as a quantity that reduces the difference ΔVs between the target value Vs* of the system voltage and the detected value Vsf output by the low pass filtering process as the detected value of the system voltage by execution of P-I control.

Figure 3:
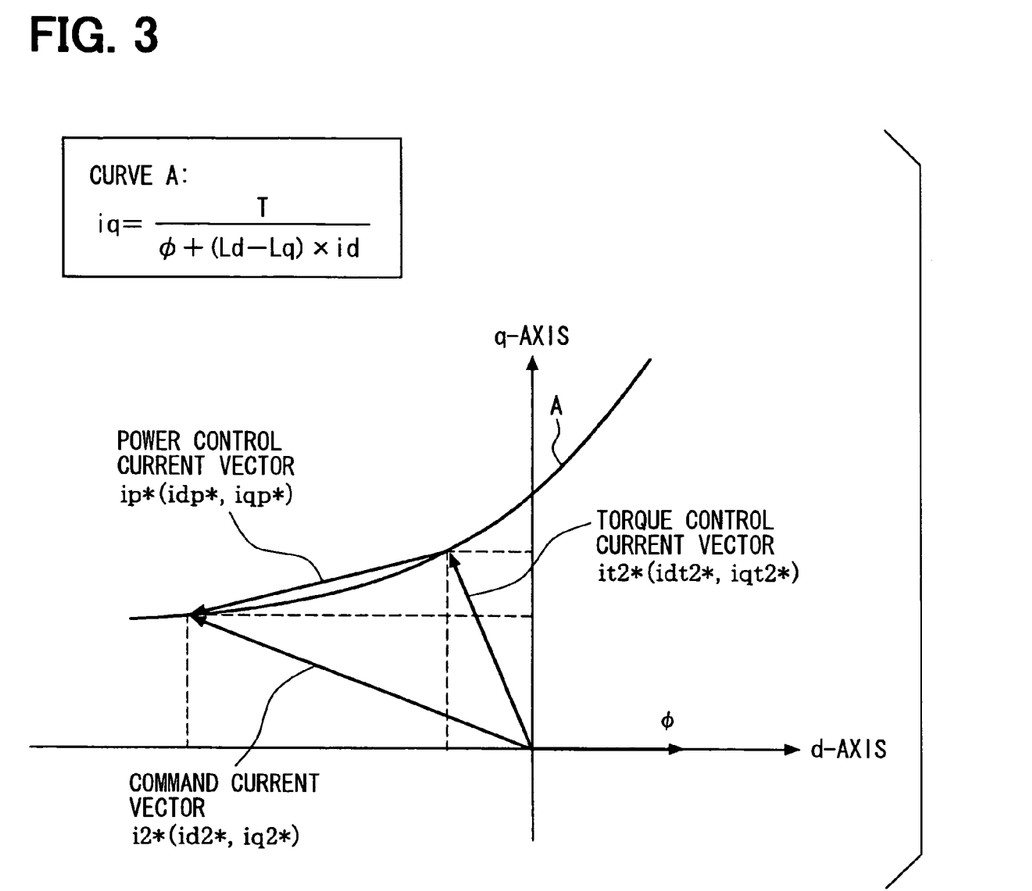
FIG. 3 is a graph showing a characteristic of a current vector used for computing a command current vector in the embodiment.

Then, the input power operation quantity Pm and the torque control current vector it2* representing a d-axis torque control current idt2* and a q-axis torque control current iqt2* are supplied to a command current computation unit 54 serving as a system voltage control means. This computation unit 54 computes a power control current vector ip* representing a d-axis power control current idp* and a q-axis power control current iqp*. The d-axis power control current idp* and the q-axis power control current iqp* change the reactive power contributing none to generation of the torque of the second AC motor 14 by the input power operation quantity Pm as shown in FIG. 3. Then, the command current computation unit 54 combines the torque control current vector it2* representing a d-axis torque control current idt2* and a q-axis torque control current iqt2* with the power control current vector ip* representing a d-axis power control current idp* and a q-axis power control current iqp* in order to compute a final command current vector i2* representing a d-axis command current id2* and a q-axis command current iq2* as expressed by the following equation:

$$i2^*(id2^*, iq2^*) = it2^*(idt2^*, iqt2^*) + ip^*(idp^*, iqp^*)$$

Figure 4:
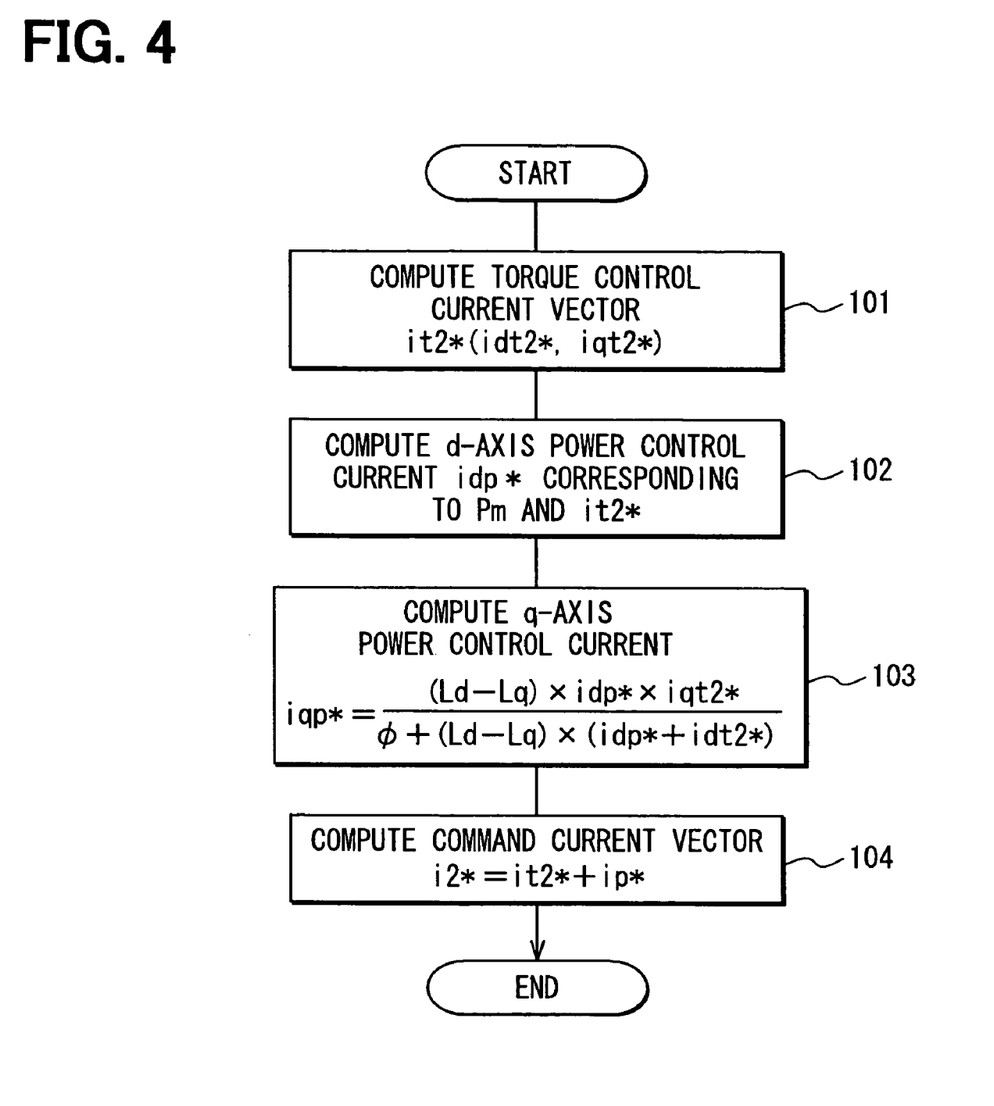
FIG. 4 is a flowchart representing processing of computing a command current vector in the embodiment.

The final command current vector i2* is computed by execution of a command current vector computation program shown in FIG. 4. The flowchart of FIG. 4 representing the command current vector computation begins at step 101 at which the torque control current vector it2* representing the d-axis torque control current idt2* and the q-axis torque control current iqt2* is computed by using typically map data or a mathematical equation as a vector according to the torque command value T2* and rotation speed N2 of the second AC motor 14.

Then, at the next step 102, the d-axis power control current idp* corresponding to the input power operation quantity Pm and the torque control current vector it2* representing the d-axis torque control current idt2* and the q-axis torque control current iqt2* is computed by using typically map data or a mathematical equation. Subsequently, at the next step 103, the q-axis power control current iqp* is computed from the d-axis power control current idp* in accordance with the following equation:

$$iqp^* = (Ld-Lq) \times idp^* \times iqt2^* / \{\phi + (Ld-Lq) \times (idp^* + idt2^*)\}$$

where notations $\phi$, Ld and Lq denote respectively a flux linkage, a d-axis inductance and a q-axis inductance, which are machine constants of the second AC motor 14.

Thus, the processes of the steps 102 and 103 are carried out to compute the power control current vector ip* representing the d-axis power control current idp* and the q-axis power control current iqp*, which change the reactive power by the input power operation quantity Pm while sustaining the torque generated by the second AC motor 14 at a constant value (that is, torque command value T2*).

Then, at the next step 104, the torque control current vector it2* representing the d-axis torque control current idt2* and the q-axis torque control current iqt2* is combined or added with the power control current vector ip* representing the d-axis power control current idp* and the q-axis power control current iqp* in order to compute a final command current vector i2* representing the d-axis command current id2* and the q-axis command current iq2* in accordance with the following equation:

$$i2^*(id2^*, iq2^*) = it2^*(idt2^*, iqt2^*) + ip^*(idp^*, iqp^*)$$

After the final command current vector i2* is computed as described above, as shown in FIG. 2, a second current vector control unit 55 computes an actual current vector i2 representing a d-axis current id2 and a q-axis current iq2 on the basis of signals output by the current sensors 43 and 44 as signals representing respectively the U-phase current iU2 and W-phase current iW2 of the second AC motor 14 as well as a signal output by the rotor rotational position sensor 40 as a signal representing the rotor rotational position θ2 of the second AC motor 14. Then, the second current vector control unit 55 computes a d-axis command voltage Vd2* by execution of P-I control for reducing a difference Δid2 between the d-axis command current idt2* and the actual d-axis current id2. The control unit 55 also computes a q-axis command voltage Vq2* by execution of P-I control for reducing a difference Δiq2 between the q-axis command current iqt2* and the actual q-axis current iq2. Finally, the second current vector control unit 55 converts the d-axis command voltage Vd2* and the q-axis command voltage Vq2* into the three-phase PWM command signals UU2, UV2 and UW2, outputting the three-phase PWM command signals UU2, UV2 and UW2 to the three-phase second inverter 28.

As described above, the control of stabilizing the system voltage is executed by adjusting the input power of the second MG unit 30 (or the second AC motor 14) in order to decrease the difference ΔVs between the target value Vs* of the system voltage and the detected value Vsf output by the low pass filtering process as the detected value of the system voltage while sustaining the torque generated by the second AC motor 14 at a constant value (that is, torque command value T2*).

In addition, in order to obviate mutual interferences between the system voltage stabilization control to stabilize the system voltage by adjusting the input power to the second MG unit 30 as described above and the control executed by the voltage boosting converter 21 to adjust the system voltage, the motor control unit 37 executes control of a conduction duty ratio Dc of a switching device (not shown) employed in the voltage boosting converter 21 so as to reduce the difference ΔPi between a command value Pi* of an output power, which is output by the voltage boosting converter 21 as a conversion power, and a detected value Pi of the conversion power.

Specifically, in order to compute the command value Pi* of the conversion power, first of all, the torque command value T1* and the rotation speed N1 of the first AC motor 13 are supplied to a first shaft output computation unit 56 to be used for computing a shaft output PD1 of the first AC motor 13. At the same time, the torque command value T1* and rotation speed N1 of the first AC motor 13 are supplied to a first shaft output loss computation unit 57 to be used for computing a first shaft output loss PL1 of the first AC motor 13. Then, an adder 58 adds the output PD1 of the first AC motor 13 to the output loss PL1 of the first AC motor 13 in order to compute an input power Pi1 of the first AC motor 13. At that time, if the first AC motor 13 is functioning as a generator, the computation result of the input power Pi1 of the first AC motor is a negative value.

In the mean time, the torque command value T2* and rotation speed N2 of the second AC motor 14 are supplied to a second shaft output computation unit 59 to be used for computing a shaft output PD2 of the second AC motor 14. At the same time, the torque command value T2* and rotation speed N2 of the second AC motor 14 are supplied to a second shaft output loss computation unit 60 to be used for computing an output loss PL2 of the second AC motor 14. Then, an adder 61 adds the output PD2 of the second AC motor 14 to the output loss PL2 of the second AC motor 14 in order to compute an input power Pi2 of the second AC motor 14. At that time, if the second AC motor 14 is functioning as a motor, the computation result of the input power Pi2 of the second MG unit 30 is a positive value.

Then, an adder 62 adds the input power Pi1 of the first AC motor 13 to the input power Pi2 of the second AC motor 14 to compute a total power Pi*. This total power Pi* is supplied to a second low pass filter 63 serving as a second low-frequency component passing means for carrying out a low pass filtering process to pass only components included in the total power Pix* as components each having a low frequency. A total power Pif* obtained by the low pass filtering process is taken as a command value Pif* of the conversion power. The adder 62 and the second low pass filter 63 operate as a conversion power command value computation means.

In order to compute a detected value Pi of the conversion power, on the other hand, a signal output by the current sensor 26 as a signal representing a detected value ic of the output current of the voltage boosting converter 21 is supplied to a third low pass filter 64 serving as a third low-frequency component passing means for carrying out a low pass filtering process to pass only components included in the output current of the voltage boosting converter 21 as components each having a low frequency. The third low pass filter 64 supplies a detected value icf of the output current of the voltage boosting converter 21 as a result obtained from the low pass filtering process to a conversion power detection unit 65 serving as a conversion value computation means. The conversion power detection unit 65 multiplies the detected value icf by the target value Vs* of the system voltage in order to compute the detected value Pi of the conversion power. It is to be noted that the detected value Pi of the conversion power can also be computed by multiplying the detected value icf of the output current of the voltage boosting converter 21 by the detected value Vsf of the system voltage.

Then, a subtractor 66 computes a difference ΔPi between the command value Pif* and detected value Pi of the conversion power. The subtractor 66 supplies the difference ΔPi to a P-I controller 67 serving as a conversion power control-quantity computation means for computing the conduction duty ratio Dc of a switching device (not shown) by execution of P-I control to reduce the difference ΔPi between the command value Pif* and detected value Pi of the conversion power. The conduction duty ratio Dc is supplied to the voltage boosting drive signal computation unit 68 serving as a conversion power control means. Subsequently, the voltage boosting drive signal computation unit 68 computes voltage boosting drive signals UCU and UCL on the basis of the conduction duty ratio Dc and supplies the voltage boosting drive signals UCU and UCL to the voltage boosting converter 21.

As described above, the conversion power control of adjusting the conversion power of the voltage boosting converter 21 is executed in order to reduce the difference ΔPi between the command value Pif* and detected value Pi of the conversion power and, at the same time, obviate mutual interferences between the system voltage stabilization control to stabilize the system voltage by adjusting the input power of the second MG unit 30 (second AC motor 14) and the control executed by the voltage boosting converter 21 to adjust the system voltage.

In the above embodiment, the input power to the second MG unit 30 (second AC motor 14) is adjusted in order to reduce the difference ΔVs between the target value Vs* and detected value Vsf of the system voltage to thereby suppress variations of the system voltage appearing on the power supply line 22. Thus, even if the balance of power between the first and second AC motors 13 and 14 changes substantially due to a change of the operating condition of the electric vehicle or for some, the system voltage can be stabilized effectively. In addition, it is possible to enhance the effect of stabilizing the system voltage appearing on the power supply line 22 while meeting demands for a system having a small size and a low cost without requiring the voltage boosting converter 21 to be of better performance and the smoothing capacitor 24 to have a larger capacitance.

In addition, in the above embodiment, an input power (that is, reactive power) different from a power required for the second AC motor 14 to generate torque is adjusted to control the system voltage. Thus, the system voltage can be stabilized effectively by adjusting the input power to the second AC motor 14, while sustaining the torque of the second AC motor 14 constant (torque command value T2*). As a result, variations in the system voltage can be suppressed without affecting adversely to operating conditions of the vehicle.

Further, in the above embodiment, the current vector of the second AC motor 14 is adjusted in order to control the input power to the second AC motor 14 while sustaining the torque generated by the second AC motor 14 unchanged. It is to be noted, however, that the voltage vector of the second AC motor 14 can also be adjusted in order to control the input power of the second AC motor 14 while sustaining the torque generated by the second AC motor 14 constant.

In the above embodiment, the input power operation quantity Pm of the second AC motor 14 is computed by using the detection value Vsf of the system voltage, which has been subjected to the low pass filtering. Therefore, the input power operation quantity Pm can be computed by using the detection value Vsf of the system voltage, noise components (high frequency components) of which have been eliminated by the low pass filtering process. As a result, the accuracy of computation of the input power operation quantity can be enhanced.

It is likely that, if the system voltage stabilization control is executed in order to stabilize the system voltage by adjusting the input power of the second MG unit 30 (or the second AC motor 14), there are mutual interferences between the system voltage stabilization control to stabilize the system voltage by adjusting the input power of the second MG unit 30 (second AC motor 14) and the control executed by the voltage boosting converter 21 to adjust the system voltage.

For this reason, in the above embodiment, the command value Pif* is computed from the total power Pi* obtained by adding the input power Pi1 of the first AC motor 13 and the input power Pi2 of the second AC motor 14. At the same time, the detected value Pi of the conversion power is computed by multiplying the detected value icf of the output current of the voltage boosting converter 21 by the target value Vs* (or detected value Vsf) of the system voltage. Then, the conversion power control of adjusting the output power of the voltage boosting converter 21 is executed in order to reduce the difference ΔPi between the command value Pif* and detected value Pi of the conversion power. Thus, it is possible to obviate the mutual interferences between the system voltage stabilization control to stabilize the system voltage by adjusting the input power of the second MG unit 30 (second AC motor 14) and the control executed by the voltage boosting converter 21 to adjust the system voltage.

In the above embodiment, the conversion power control of adjusting the output power of the voltage boosting converter 21 is executed in order to reduce the difference ΔPi between the command value Pi* and detected value Pi of the conversion power. Instead of adjusting the output power of the voltage boosting converter 21, however, the conversion power control of adjusting the input power of the voltage boosting converter 21 can be executed in order to reduce the difference ΔPi between the command value Pi* and detected value Pi of the conversion power.

In the above embodiment, the total power Pi* of the input power Pi1 of the first AC motor 13 and the input power Pi2 of the second AC motor 14 is subjected to the low pass filtering process to be used as the command value Pif* of the conversion power. Therefore, the total power Pif*, which is free from noise components (high frequency components) due to the low pass filtering process, can be used as the command value Pif* of the conversion power. As a result, the command value Pif* of the conversion power can be set accurately.

Still further, in the above embodiment, the detection value Pi of the conversion power is computed by using the detection value icf of the output current of the voltage boosting converter 21 after subjecting to the low pass filtering process. Therefore, the detection value Pi of the conversion power can be computed by using the detection value icf of the output current, from which noise components (high frequency components) included in the detection value ic of the output current have been eliminated by the low pass filtering process. As a result, the accuracy of computation of the detection value Pi of the conversion power can be enhanced.

Furthermore, in the above embodiment, in execution of the system voltage stabilization control, the input power of the second MG unit 30 (second AC motor 14) is controlled to suppress variations in system voltage. Instead of controlling the input power of the second MG unit 30 (second AC motor 14), however, the input power of the first MG unit 29 (first AC motor 13) can also be controlled to suppress variations in system voltage. As an alternative, although not shown, in a all-wheel driving configuration including a third MG unit mounted on the dependent wheels, for example, the input power of the third MG unit can also be controlled so as to suppress variations in system voltage.

Moreover, the above embodiment is directed to a hybrid vehicle employing both an AC motor and an engine as a motive power source. However, the embodiment may be modified to a vehicle employing only AC motors as a motive power source. The embodiments may employ only one MG unit comprising an inverter and an AC motor as well as a vehicle employing three or more MG units.

What is claimed is:

1. A control apparatus for an electric vehicle, comprising:
   a power converter that converts a voltage supplied by a DC power supply into a system voltage appearing on a power supply line;
   a motor driving unit that includes an inverter connected to the power supply line and an AC motor driven by the inverter; and
   a system voltage controller that executes system voltage stabilization control to suppress variations in the system voltage by adjusting an input power of the motor driving unit, while sustaining a torque generated by the motor driving unit at a torque command value;
   wherein the system voltage controller controls the system voltage by adjusting an input power of the AC motor different from an input power required for the AC motor to generate torque.

2. The control apparatus according to claim 1, further comprising:
   a target voltage setting unit that sets a target value of the system voltage;
   a voltage detector that detects the system voltage; and
   a power operation quantity calculator that computes an operation quantity of an input power of the motor driving unit on the basis of the target value set by the target voltage setting unit and the system voltage detected by the voltage detector,
   wherein the system voltage controller that controls the system voltage by adjusting the input power of the motor driving unit on the basis of the operation quantity of the input power computed by the power operation quantity calculator.

3. The control apparatus according to claim 2, further comprising:
   a low frequency filter that passes only low frequency components of the system voltage detected by the voltage detector, the low frequency components being lower than a predetermined frequency,
   wherein the power operation quantity calculator computes the operation quantity of the input power by using the system voltage, which has passed the low frequency filter.

4. The control apparatus according to claim 1, further comprising:
   a conversion power controller that controls a conversion power, which is an input power or an output power, of the power converter.

5. The control apparatus according to claim 4, further comprising:
   a conversion power command value calculator that computes a command value of the conversion power;
   a conversion power detector that detects the conversion power; and
   a conversion power control quantity calculator that computes a control quantity of the conversion power on the basis of the command value of the conversion power and the conversion power detected by the conversion power detector,
   wherein the conversion power controller controls the conversion power on the basis of the control quantity of the conversion power.

6. The control apparatus according to claim 5, further comprising:
   an additional motor driving unit connected to the power supply line,
   wherein the conversion power command value calculator computes the command value of the conversion power on the basis of at least a total of input powers of all the motor driving units.

7. The control apparatus according to claim 6, further comprising:
   a low frequency filter that passes only low frequency components of a power including at least the total of input powers of all the motor driving units, the low frequency components being lower than a predetermined frequency,
   wherein the conversion power command value calculator computes the command value of the conversion power on the basis of low frequency power, which has passed the low frequency filter.

8. The control apparatus according to claim 5, further comprising:
   a current detector that detects an output current of the power converter,
   wherein the conversion power detector computes the conversion power on the basis of the output current of the power converter and either one of the target value of the system voltage and a detection value of the system voltage.

9. The control apparatus according to claim 6, further comprising:
   a low frequency filter that passes only low frequency components of the output current detected by the current detector, the low frequency components being lower than a predetermined frequency,
   wherein the conversion power detector computes the conversion power on the basis of low frequency output current, which has passed the low frequency filter.

10. The control apparatus according to claim 1, wherein the system voltage controller controls the input power of the motor driving unit by adjusting a vector of a current flowing to the AC motor or a vector of a voltage applied to the AC motor.

11. A control method for an electric vehicle control system that includes a power line, a converter for converting DC power of one voltage to AC power of another voltage to be supplied to the power line, a first unit including a first inverter connected to the converter and a first motor-generator connected to the first inverter, a second unit including a second inverter connected to the converter and a second motor-generator connected to the second inverter and a control unit for respectively supplying the first and second motor-generators input powers based on respective rotation angles and respective rotation speeds, the method comprising:

adjusting only a portion of an input power of the second motor-generator thereby to suppress variations in a system voltage on the power line, while sustaining a torque generated by the second motor-generator at a command value, the portion of the input power being different from other portion of the input power that is required for generation of a torque of the second motor-generator.

12. The control method according to claim 11, wherein a step of adjusting includes:

providing the command value of the system voltage;

detecting an actual value of the system voltage; and providing the portion of the input power by decreasing a difference between the command value and the actual value.

13. The control method according to claim 12, further comprising:

decreasing the difference in total input power supplied to the converter between the command value and the actual value.

14. A control apparatus for an electric vehicle, comprising:

a power converter that converts a voltage supplied by a DC power supply into a system voltage appearing on a power supply line;

a motor driving unit that includes an inverter connected to the power supply line and an AC motor driven by the inverter;

a system voltage controller that executes system voltage stabilization control to suppress variations in the system voltage by adjusting an input power of the motor driving unit;

a target voltage setting unit that sets a target value of the system voltage;

a voltage detector that detects the system voltage; and a power operation quantity calculator that computes an operation quantity of an input power of the motor driving unit on the basis of the target value set by the target voltage setting unit and the system voltage detected by the voltage detector;

wherein the system voltage controller that controls the system voltage by adjusting the input power of the motor driving unit on the basis of the operation quantity of the input power computed by the power operation quantity calculator;

the control apparatus further comprises a low frequency filter that passes only low frequency components of the system voltage detected by the voltage detector, the low frequency components being lower than a predetermined frequency; and the power operation quantity calculator computes the operation quantity of the input power by using the system voltage, which has passed the low frequency filter.

15. A control apparatus for an electric vehicle, comprising:

a power converter that converts a voltage supplied by a DC power supply into a system voltage appearing on a power supply line;

a motor driving unit that includes an inverter connected to the power supply line and an AC motor driven by the inverter;

a system voltage controller that executes system voltage stabilization control to suppress variations in the system voltage by adjusting an input power of the motor driving unit;

a conversion power controller that controls a conversion power, which is an input power or an output power, of the power converter;

a conversion power command value calculator that computes a command value of the conversion power;

a conversion power detector that detects the conversion power; and a conversion power control quantity calculator that computes a control quantity of the conversion power on the basis of the command value of the conversion power and the conversion power detected by the conversion power detector;

wherein the conversion power controller controls the conversion power on the basis of the control quantity of the conversion power;

the control apparatus further comprises an additional motor driving unit connected to the power supply line;

the conversion power command value calculator computes the command value of the conversion power on the basis of at least a total of input powers of all the motor driving units;

the control apparatus further comprises a low frequency filter that passes only low frequency components of a power including at least the total of input powers of all the motor driving units, the low frequency components being lower than a predetermined frequency; and the conversion power command value calculator computes the command value of the conversion power on the basis of low frequency power, which has passed the low frequency filter.

16. A control apparatus for an electric vehicle, comprising:

a power converter that converts a voltage supplied by a DC power supply into a system voltage appearing on a power supply line;

a motor driving unit that includes an inverter connected to the power supply line and an AC motor driven by the inverter;

a system voltage controller that executes system voltage stabilization control to suppress variations in the system voltage by adjusting an input power of the motor driving unit;

a conversion power controller that controls a conversion power, which is an input power or an output power, of the power converter;

a conversion power command value calculator that computes a command value of the conversion power;

a conversion power detector that detects the conversion power; and a conversion power control quantity calculator that computes a control quantity of the conversion power on the basis of the command value of the conversion power and the conversion power detected by the conversion power detector;

wherein the conversion power controller controls the conversion power on the basis of the control quantity of the conversion power;

the control apparatus further comprises an additional motor driving unit connected to the power supply line;

the conversion power command value calculator computes the command value of the conversion power on the basis of at least a total of input powers of all the motor driving units;

the control apparatus further comprises a low frequency filter that passes only low frequency components of the output current detected by the current detector, the low frequency components being lower than a predetermined frequency; and the conversion power detector computes the conversion power on the basis of low frequency output current, which has passed the low frequency filter.

* * * * *